March 13, 1928.  
G. J. ABBOTT  
1,662,654

EXPANDING PULLEY

Filed Oct. 9, 1926

INVENTOR  
G. J. Abbott,  
By Watson, Coit, Morse & Grindle  
ATTYS.

Patented Mar. 13, 1928.

1,662,654

UNITED STATES PATENT OFFICE.

GEOFFREY JOSEPH ABBOTT, OF LONDON, ENGLAND.

EXPANDING PULLEY.

Application filed October 9, 1926. Serial No. 140,636.

This invention relates to pulleys of the expanding type and has for its object to provide a pulley of variable effective diameter which can be attached to the shaft of an electric motor or other prime mover in place of the ordinary driving pulley so as to enable the speed of the driven shaft to be varied at will.

The invention is particularly applicable to pulleys of the kind comprising flanges having oppositely inclined faces provided with alternate ribs and depressions. With such pulleys are used chains of the self pitching or automatically adjusting type covered by the present applicant's prior application for Letters Patent of the United States of America Serial No. 67,971.

The expanding pulley made in accordance with this invention together with its adjusting mechanism is adapted to be secured as a unit to the shaft of the prime mover, the adjusting mechanism being supported solely by the shaft but not participating in the rotary movement thereof.

Figure 1:
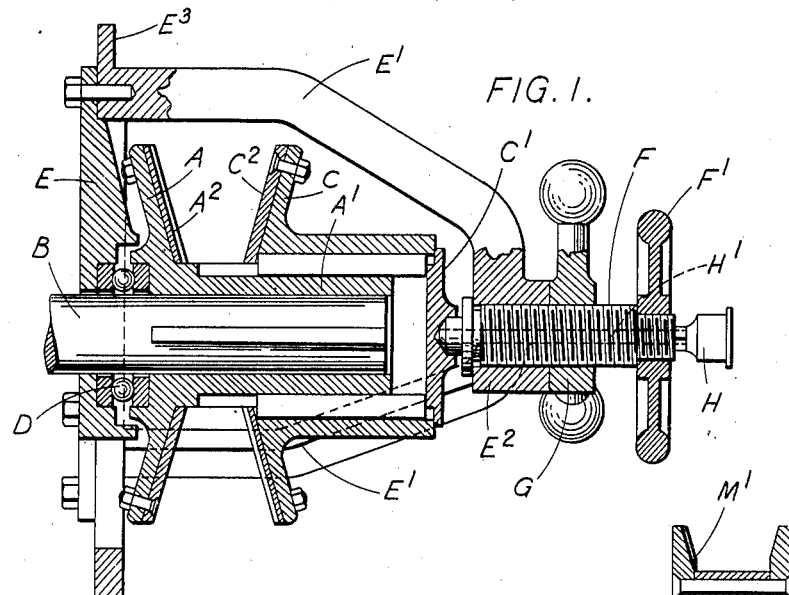
Figure 3:
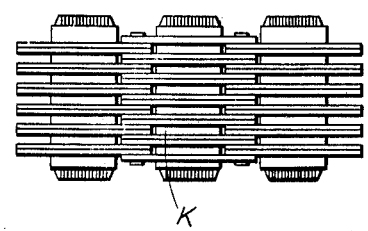
Figure 2:
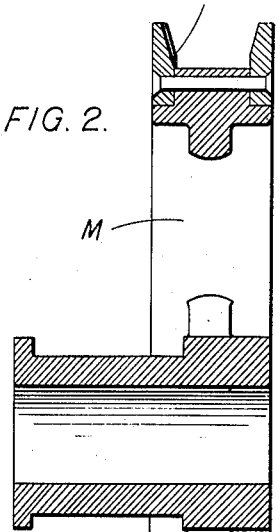
Figure 4:
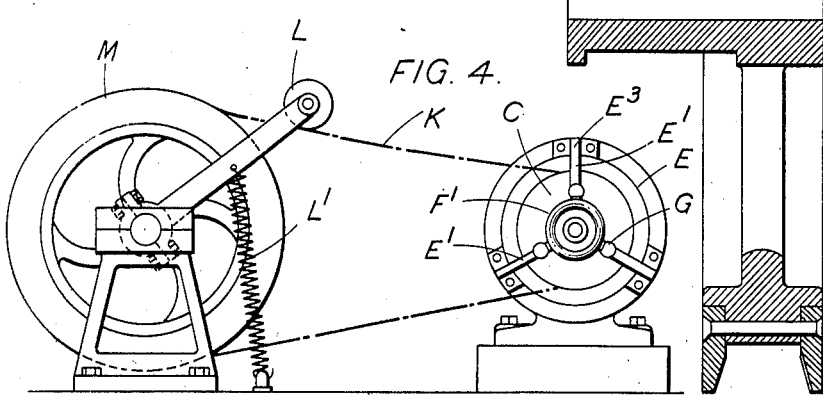

The expanding pulley is conveniently utilized as the driver, the driven pulley being of fixed diameter and a chain of the self pitching type is used for transmission purposes. Such an arrangement is illustrated by way of example in the accompanying drawings, in which Figure 1 is a sectional elevation of the expanding pulley, Figure 2 is a sectional elevation of the non-expanding pulley, Figure 3 shows a portion of the driving chain in plan, and Figure 4 shows the expanding pulley applied to an electric motor together with the driving chain and the driven pulley.

In the construction illustrated the pulley comprises a fixed flange A which is bored to fit the spindle B of the motor or other prime mover to which it is keyed so as to rotate therewith. The fixed pulley flange A is provided with an extension sleeve $A^1$ upon which is mounted to slide the movable pulley flange C. The flanges A and C carry toothed or ribbed faces preferably in the form of detachable grooved saucers or the like $A^2$ $C^2$, as described in the present applicant's Patent 1,637,402 dated August 2, 1927.

Rotatably mounted upon the inner end of the fixed flange A, for example upon a ball bearing D, is a disc E which is held against rotation by any suitable member, for example by means of a bracket secured to the floor or some fixed part of the prime mover. This disc E is provided with three or any other suitable number of spider arms $E^1$ which terminate in a common boss $E^2$ provided with a central screwthreaded aperture in axial alignment with the motor shaft B.

The boss $E^2$ carries a screwthreaded spindle F furnished with an operating hand wheel $F^1$ and the inner end of the screwthreaded member F engages a plate or disc $C^1$ bearing upon the outer end of the boss of the movable pulley flange C.

The arrangement is such that the effective diameter of the expandible pulley can be varied by rotating the hand wheel $F^1$ and thus exerting thrust through the screw F and plate $C^1$ upon the outer end of the boss of the movable flange C. Thus the flange C is brought nearer to or moved away from the fixed flange A so that the effective diameter of the pulley is increased or reduced.

A lock nut G is furnished to hold the screwthreaded member F in its position of adjustment and a lubricator H contains grease which passing through a bore hole $H^1$ in the screw F prevents undue friction between the end of the screwthreaded member and the disc $C^1$. In some cases if desired a ball bearing may be provided between the thrust exerting member and the outer end of the movable pulley flange.

When the effective diameter of the pulley is thus varied the slack in the chain K is taken up by means of a jockey pulley L controlled by a spring $L^1$, the driven shaft carrying a relatively large pulley M also provided with driving teeth $M^1$ upon its opposite flanges.

The whole arrangement can be applied to an existing motor or other prime mover merely by removing the key from the usual driving pulley and sliding the new fitting complete as a unit on to the driving shaft, the driven pulley being similarly replaced by means of the toothed pulley M above described which can easily be made up as a unit with the spring-controlled jockey pulley L.

Preferably some means are provided for preventing rotation of the disc E such means conveniently comprising a lug engaging with a pin projecting from the floor or from the framework of the motor. In the drawing the disc is illustrated as having a lug E³ engaging with two pins on the motor framework. Such means, however, play no part in supporting the pulley or disc and serve as a precaution to prevent damage to the chain or pulley in the event of failure on the part of the thrust bearing.

What I claim as my invention and desire to secure by Letters Patent is:—

1. In an expanding pulley of the kind in which the oppositely inclined flange faces have alternate ribs and depressions, the combination of a flange adapted to be secured to a rotatable shaft, a second flange axially movable relatively to the first flange, means for adjusting the relative positions of the two flanges, and means for supporting said adjusting means solely from the pulley shaft comprising a free member journaled on said shaft, a framework rigidly connected thereto, and a boss therein coaxial with the shaft but axially spaced therefrom.

2. In an expanding pulley of the kind in which the oppositely inclined flange faces have alternate ribs and depressions, the combination of a flange adapted to be secured to a rotatable shaft, a second flange axially movable relatively to the first flange, means for adjusting the relative positions of the two flanges, and means for supporting said adjusting means solely from the pulley shaft comprising a free member journaled on said shaft, a framework rigidly connected thereto, and a boss therein coaxial with the shaft but axially spaced therefrom, said free member being of greater diameter than the pulley, whereby said framework may enclose said pulley.

In testimony whereof I have signed my name to this specification.

GEOFFREY JOSEPH ABBOTT.